Patented Dec. 27, 1938

2,141,169

UNITED STATES PATENT OFFICE 2,141,169

PROCESS OF MAKING SHAPED ARTICLES FROM SYNTHETIC POLYMERS

Willard E. Catlin, Wilmington, Del., assignor to E. I. du Pont de Nemours & Company, Wilmington, Del., a corporation of Delaware No Drawing. Application February 15, 1937, Serial No. 125,927

15 Claims. (Cl. 18—57)

This invention relates to new articles of manufacture comprising sheets and films and more particularly to the preparation of transparent films and sheets from synthetic linear condensation polyamides.

A new class of artificial fiber-forming materials derived from bifunctional reactants and known as synthetic linear condensation polyamides has been described in applications of W. H. Carothers, namely, in application Serial Number 180, filed January 2, 1935; in application Serial Number 74,811, filed April 16, 1936, and in the applications referred to in the last mentioned case. These polyamides are of two types, those derived from polymerizable monoaminomonocarboxylic acids and their amide-forming derivatives (ester, chloride, anhydride, and amide) and those derived from the reaction of suitable diamines with suitable dicarboxylic acids or amide-forming derivatives of dibasic dicarboxylic acids. The fiber-forming polyamides are crystalline in character as evidenced by their sharp melting points and the nature of the diagram which they furnish on X-ray examination. They are generally insoluble in the more common organic solvents but are soluble in phenols and usually in certain organic acids, e. g. formic and acetic. As indicated in the above mentioned applications, these polyamides can be formed into filaments which yield oriented fibers on application of stress. These fiber-forming polyamides can also be formed into films as mentioned in the applications referred to above but the films flowed or cast in accordance with the usual procedure for depositing films from film-forming materials are translucent or cloudy, due apparently to the crystalline character of these polyamides, and are therefore of limited utility.

This invention has as an object the preparation of strong, transparent, flexible films and sheets from synthetic materials. A further object resides in a novel process for making the mentioned films and sheets. Other objects will appear hereinafter.

These objects are accomplished by flowing films from a solution of a synthetic linear polyamide of intrinsic viscosity above 0.4 containing hydrogen chloride and removing the solvent therefrom, preferably by evaporation.

I have found that valuable transparent films can be prepared from solutions of high viscosity synthetic linear condensation polyamides, particularly fiber-forming polyamides, to which hydrogen chloride has been added. Clear films can be flowed directly from hydrochloric acid solutions of the polyamides but it is generally desirable to prepare the films from solutions of the polyamide in organic solvents to which hydrogen chloride or hydrochloric acid has been added. A very valuable composition for the formation of films is prepared by adding a methanol solution of hydrogen chloride to a formic acid solution of the polyamide. However, hydrogen chloride dissolved in water, ethanol, acetone, ether, and similar liquids can be used in place of, or in conjunction with, the methanol solution of hydrogen chloride. The quantity of hydrogen chloride required to secure clear films differs with different polyamides. For example, interpolymers (copolymers) have a tendency to be less crystalline in character than other types of polyamides and can often be obtained as clear films with the use of only a few percent of hydrogen chloride based on the polyamide content. This is also true of many polyamides which have a hydrocarbon radical attached to the chain of atoms separating the amide groups in the polymer. As examples of this class might be mentioned polyamides derived from such diamines as 3-methyl hexamethylenediamine and from dicarboxylic acids such as $\beta$-methyl adipic acid. Thus, the fiber-forming polyamides derived from the reaction of 3-methyl hexamethylenediamine with adipic acid and from the reaction of hexamethylenediamine with $\beta$-methyl adipic acid are alcohol soluble and yield clear films with the use of only small amounts of hydrogen chloride. With most polyamides, however, at least 25% of hydrogen chloride is required. Very satisfactory results are obtained by using from 35 to 75% of hydrogen chloride. Owing to the fact that hydrogen chloride causes slow hydrolysis of the polyamide, it is desirable to use these solutions soon after they are prepared.

Films can be prepared from the above mentioned hydrogen chloride containing solutions of the synthetic linear condensation polyamides by various methods. A convenient method consists in flowing a solution on a suitable surface, e. g., a glass plate, spreading the solution with a doctor knife to insure uniform thickness, and then allowing the solvent to evaporate, preferably in an atmosphere of low humidity. The absolute viscosity of the solution should be high enough to prevent the solution from flowing too freely but low enough to permit it to be spread out. The solutions having an absolute viscosity of 5 to 100 poises are very satisfactory, but solutions having viscosities outside this range can be used with some success. To prevent premature loss of hydrogen chloride and to avoid hydrolysis, the films should not be heated much above 50° C. during the early stages in the removal of the solvent. Reduced pressure may be used if desired to hasten the evaporation. After the film has set up in definite form, the residual solvent and hydrogen chloride can be removed at a more elevated temperature, e. g. 75–150° C. The dry film is then removed from the surface, this operation being facilitated by immersing in water. In place of flowing the solution on a plate the solution may be passed through suitable rolls or a slit in an extruding device or hopper and the extruded portion passed into a drying chamber.

For the preparation of films synthetic linear polyamides should be used having an intrinsic viscosity above 0.4, and preferably above 0.6, where intrinsic viscosity is defined as $$\frac{\log_e \lambda_r}{C}$$

in which $\lambda_r$ is the viscosity of the dilute meta-cresol solution of the polymer divided by the viscosity of meta-cresol in the same units at the same temperature, and C is the concentration in grams of polymer per 100 cc. of solution. Polyamides having intrinsic viscosities in the range from 0.8 to 2.0 are especially useful in the preparation of films according to the process of this invention, but clear useful films can also be prepared from polyamides having intrinsic viscosities outside of this range. In its broader aspects, therefore, this invention is applicable to synthetic linear condensation polyamides having an intrinsic viscosity above 0.4.

Hydrogen chloride appears to be unique in its action on the polyamides in the film-forming operation. Acids, such as hydrobromic, sulfuric, and oxalic, are relatively ineffective, i. e., their addition to polyamide solutions does not overcome the tendency of these solutions to give cloudy films, particularly after wetting.

While the mechanism by which hydrogen chloride functions in the preparation of transparent films may not be described with complete certainty, it seems probable that transparency of the films is due to the temporary formation of an amide hydrochloride which is stable during the time required to set up the film during the initial low temperature operation (removal of solvent) and that the hydrochloride acts as a crystallization inhibitor. The hydrochloride is unstable on further heating and liberates hydrogen chloride to give a polyamide film in which the polyamide cannot crystallize further. Properly dried films are practically free of halogen.

The transparency of the films produced by the method of this invention appears to be due to the fact that the films are composed of minute crystal aggregates, (less than 20 microns and usually less than 2 microns in diameter) whereas those (translucent) prepared without the use of hydrogen chloride have much larger crystal aggregates. This is indicated by the results of microscopic examination. While the transparent and translucent films show identical X-ray diffraction patterns, namely, that of an unoriented crystalline material, microscopic examination shows that the crystal aggregates are much smaller in the case of the transparent films.

Films of varying thicknesses can be prepared by the method herein described. Owing to the fact that the solvent is more difficultly removed from thick films, this invention is most applicable to the preparation of thin films, particularly those having a thickness less than 0.002 inch.

The films obtained according to the method of this invention are clear and transparent, although they may contain a slight haze in some instances. The films are comparable with regenerated cellulose films in strength (dry), elongation, and ultra-violet light transmission, and are superior in tear resistance, flexibility, water impermeability and in wet strength. In general, the properties of the films, particularly the strength, improves with increase in the intrinsic viscosity of the polyamide.

For the most part the films of this invention can be oriented in much the same manner as the filaments described in the beforementioned applications of W. H. Carothers. On suitable application of stress the synthetic linear condensation polyamide films and sheets, particularly those that are relatively thin, are permanently elongated. The elongated, i. e., the "cold drawn", films exhibit fiber orientation in the direction in which the stress was applied. It is also possible to cold draw the films in all directions. This results in a large increase in area. For many purposes the cold drawn films are more desirable than the undrawn films, since they exhibit improved strength and pliability.

Synthetic linear condensation polyamide films can be readily dyed with dyes of the type used for wool and silk. The dyeing may be accomplished by immersing the films in a suitable dyeing bath or by incorporating the dye with the solution from which the films are prepared. If desired, agents which modify the luster of the films can be added in a similar manner. Inorganic and organic delusterants, which do not react with hydrogen chloride, e. g., titanium dioxide, carbon black, phthalocyanine pigments, dinaphthyl ether of ethylene glycol, decachlorodiphenyl, etc., may be added in this fashion. Other agents, such as resins, plasticizers, cellulose derivatives, oils, and the like, may also be added.

The following examples in which the parts are by weight will illustrate the invention in greater detail:

*Example I*

The fiber-forming polyamide used in this example was prepared by heating hexamethylene diammonium adipate (salt derived from hexamethylenediamine and adipic acid) for four hours at 288° C. The polymer, polyhexamethylene adipamide, had an intrinsic viscosity of 1.69. Fifteen parts of the polyamide was dissolved in 85 parts of 98% formic acid and to this solution was added with stirring 0.5 volume of a 37% hydrochloric acid and 0.5 volume of a 33% solution of hydrogen chloride in methanol. The resultant solution was spread on a glass plate with the aid of a doctor knife. The glass plate was heated at 40° C. for 30 minutes which brought about evaporation of the major portion of the solvent, and then at 100° C. for 45 minutes. This gave a clear transparent film which was removed from the plate by immersion in water. The film had a melting point of about 248° C. Analysis of the film (thickness 0.001 inch) showed that it contained only a trace of chlorine. Other properties observed for the film, under conditions of 50% relative humidity, were: tensile strength, 5800 pounds per square inch; elongation at break, 28%; ability to withstand flexing (a measure of resistance to flexing and crumpling in arbitrary units), 3000; as compared with the following values for a regenerated cellulose film: tensile strength, 6600 pounds per square inch; elongation at break, 37%; ability to withstand flexing, 200. The polyamide film was superior to the cellulose film in tear resistance.

Example II

Fifteen parts of polyhexamethylene adipamide (intrinsic viscosity 1.69) was dissolved in 85 parts of 98% formic acid and to this solution was added 0.2 volume of a saturated solution of hydrogen chloride in ether. Films were cast from this solution following the method described in Example I. The films were dried for one hour at 40° C. and then for one hour at 100° C. The films had a thickness of approximately 0.001 inch, were transparent, and had properties comparable with those of the polyamide film described in the preceding example.

Example III

A thin layer of a 15% solution of fiber-forming polyhexamethylene adipamide in 37% hydrochloric acid was spread on a glass plate. The solvent evaporated more slowly than in the preceding examples. After one hour's heating at 110° C., however, a transparent film (thickness 0.001 inch) was obtained which exhibited some haze. This film was inferior to that obtained in the preceding example in strength and flexibility but was useful in certain applications.

Example IV

Twenty parts of polyhexamethylene adipamide (intrinsic viscosity 1.69) was dissolved in 80 parts of 90% formic acid. To this solution was added two parts of diphenylolpropane, 0.3 volume each of 37% formaldehyde, 37% hydrochloric acid, and 35% solution of hydrogen chloride in methanol. Films cast from this solution and dried for one hour at 40° C. and one hour at 110° C. were very clear and strong. The films showed no tendency to melt at 270° C. whereas those in the preceding examples melted at about 248° C. The high melting point of this product is probably due to the presence of diphenylolpropane - formaldehyde resin within the film.

Example V

Forty parts of an interpolymer (intrinsic viscosity 1.05) prepared from equimolecular amounts of hexamethylene diammonium adipate and decamethylene diammonium sebacate was dissolved in 100 parts of 98% formic acid. This solution was diluted with one-half volume of 37% hydrochloric acid. A film of this solution was spread on a glass plate, dried at 100° C., and then detached by immersion in water. The film was clear, strong and more pliable than the polyhexamethylene adipamide films described in the preceding examples. Clear films can be obtained in a similar manner from this interpolymer using as solvent butanol containing a small amount of hydrogen chloride.

Example VI

A solution was prepared from four parts of 6-aminocaproic acid polymer of intrinsic viscosity 0.4 and 10 parts of 98% formic acid. To one volume of this solution was added one-half volume of concentrated hydrochloric acid. A film of this solution was spread on a glass plate by means of a doctor knife and dried for 0.5 hour at 50° C. and then for one hour at 100° C. This gave a transparent film, but owing to the fact that the polymer had a low intrinsic viscosity the film was not so strong as those described in the preceding examples.

Synthetic linear condensation polyamides of the kind mentioned above and in the applications above referred to are in general useful for the practice of this invention and can be converted into transparent films in a manner similar to that described in the specific examples. A valuable class of polyamides for the preparation of transparent films are those derived from diamines of formula $NH_2CH_2RCH_2NH_2$ and dicarboxylic acids of formula $HOOCCH_2R'CH_2COOH$ or their amide-forming derivatives, in which R and R' are divalent hydrocarbon radicals free from olefinic and acetylenic unsaturation and in which R has a chain length of at least two carbon atoms. An especially valuable group of polyamides within this broad class are those in which R is $(CH_2)_x$ and R' is $(CH_2)_y$, wherein $x$ and $y$ are integers and $x$ is at least 2. As examples of polyamides which fall within one or both of these groups might be mentioned polytetramethylene adipamide, polytetramethylene suberamide, polytetramethylene sebacamide, polypentamethylene adipamide, polypentamethylene sebacamide, polyhexamethylene adipamide, polyhexamethylene sebacamide, polyoctamethylene adipamide, polydecamethylene adipamide, polydecamethylene p-phenylene diacetamide, and poly-p-xylylene sebacamide. This invention is not limited, however, to the use of polyamides of the diamine-dibasic acid type; those prepared from polymerizable monoaminomonocarboxylic acids or their amide-forming derivatives are also readily obtained in the form of transparent films by the method herein described. As examples of this type of polyamide might be mentioned, in addition to that described in Example VI, the polymers derived from 7-aminoheptoic acid, 9-aminononanoic acid, and 11-aminoundecanoic acid. It is within the scope of this invention to prepare transparent films from mixtures of preformed polyamides as well as from interpolymers, i. e., polymers derived from a mixture of polyamide-forming reactants, e. g., a mixture of two diamines with one or more dicarboxylic acids, or a mixture of a diamine and a dicarboxylic acid with a polymerizable monoaminomonocarboxylic acid.

Example IV illustrates the preparation of a film in the presence of resin-forming reactants, namely, a phenol and formaldehyde. This furnishes a method for modifying the properties of the film. If desired, preformed resins and plasticizers may also be incorporated with the polyamide film in a similar fashion. Suitable modifying agents are resinous polyamides, e. g., those derived from diamines and dibasic acids, such as 1,3-diamino propanol-2, 2,2'-diamino diethyl ether, diphenylolpropane diacetic acid, thiodiglycolic acid, maleic acid, fumaric acid, and phoronic acid. Resins of the urea-formaldehyde and polyhydric alcohol-polybasic acid types can also be used in limited amounts. As suitable plasticizers for the transparent films might be mentioned ortho-hydroxydiphenyl, diphenylolpropane, and paratoluene sulfonethylamide. As already indicated, dyes may also be added.

It has been stated that hydrogen chloride is unique in bringing about the formation of transparent films from solutions of crystalline polyamides. This does not mean that it is necessary to add the hydrogen chloride as such to the film-forming solution. Reagents, such as organic and inorganic acid chlorides which liberate hydrogen chloride under the conditions of the film-forming reaction, may also be used. Thus, it is possible to prepare transparent films from a formic acid solution of polyamide to which thionyl chloride (SOCl₂) has been added.

This invention provides a simple and economical method for the preparation of clear films, sheets, foils, and related shaped articles from high viscosity synthetic linear condensation polyamides, particularly fiber-forming polyamides of this type. The films are comparable with regenerated cellulose films in strength and in elongation, and ultra-violet light transmission, and are superior in tear resistance, water impermeability, and flexibility. The polyamide films can frequently be used in the same applications as regenerated cellulose films. Thus, they may be used as wrapping materials or for decorative purposes. They may also be used as a leather substitute and as an interlayer in the preparation of laminated articles, e. g., "safety-glass". Another use of the films is in coating articles, particularly sheeted materials such as paper, cloth, and leather. The film can be attached to the article with the use of heat and/or pressure or by means of a suitable adhesive. Thick polyamide sheets can be prepared by laminating thin films. This may be done by applying heat and pressure to the films in the absence of oxygen or by combining them with the use of a suitable adhesive.

As many apparently widely different embodiments of this invention may be made without departing from the spirit and scope thereof, it is to be understood that I do not limit myself to the specific embodiments thereof except as defined in the appended claims.

I claim:

1. In a process for making transparent films and sheets, the steps comprising forming a film from a synthetic linear condensation polyamide having an intrinsic viscosity above 0.4, in a solution containing hydrogen chloride, and removing solvent from said film.

2. In a process for making transparent films and sheets, the steps comprising forming a film from a synthetic fiber-forming polyamide in a solution containing hydrogen chloride, and removing the solvent from said film.

3. In a process for making transparent films and sheets, the steps comprising forming a film from a synthetic crystalline polyamide in a solution containing hydrogen chloride, and removing the solvent from said film.

4. A process for making transparent films and sheets which comprises forming a film from a solution of a synthetic linear condensation polyamide of intrinsic viscosity above 0.4 in a solvent comprising hydrogen chloride, removing solvent from said film, and heating the film to remove the major portion of the retained hydrogen chloride.

5. A process for making transparent films and sheets which comprises forming a film from a solution of a fiber-forming synthetic linear condensation polyamide in a solvent mixture comprising formic acid and hydrogen chloride, removing the major portion of the solvent from said film at a temperature below 50° C., and heating the film at 75 to 150° C.

6. The process set forth in claim 1 in which said polyamide is obtainable from a diamine and a dibasic acid.

7. The process set forth in claim 1 in which the polyamide is the product obtainable from a diamine of the formula NH₂CH₂RCH₂NH₂ and a dicarboxylic acid of the formula

HOOCCH₂R'CH₂COOH,

R and R' in said formulae being divalent hydrocarbon radicals free from olefinic and acetylenic unsaturation and R having a chain length of at least two carbon atoms.

8. The process set forth in claim 2 in which the polyamide is the product obtainable from a diamine of the formula NH₂CH₂RCH₂NH₂ and a dicarboxylic acid of the formula

HOOCCH₂R'CH₂COOH,

R and R' in said formulae being divalent hydrocarbon radicals free from olefinic and acetylenic unsaturation and R having a chain length of at least two carbon atoms.

9. The process set forth in claim 3 in which said polyamide is obtainable from a diamine and a dibasic acid.

10. The process set forth in claim 4 in which said polyamide has an intrinsic viscosity above 0.6.

11. The process set forth in claim 4 in which said polyamide is the reaction product of a diamine and a dibasic acid.

12. The process set forth in claim 4 in which the polyamide is the product obtainable from a diamine of the formula NH₂CH₂RCH₂NH₂ and a dicarboxylic acid of the formula

HOOCCH₂R'CH₂COOH,

R in said formulae being (CH₂)ₓ and R' being (CH₂)ᵧ wherein x and y are integers and x is at least 2.

13. A process for making transparent films and sheets which comprises forming a film from a solution of a fiber-forming synthetic linear condensation polyamide in a solvent mixture comprising an alcohol and hydrogen chloride, removing the major portion of the solvent from said film at a temperature below 50° C., and heating the film at 75 to 150° C.

14. The process set forth in claim 4 in which the polyamide is polymeric hexamethylene adipamide.

15. The process set forth in claim 13 in which the alcohol is methanol.

WILLARD E. CATLIN.